Sept. 2, 1952     C. R. ROTHE ET AL     2,609,091
BICYCLE WHEEL BRACE
Filed June 14, 1949
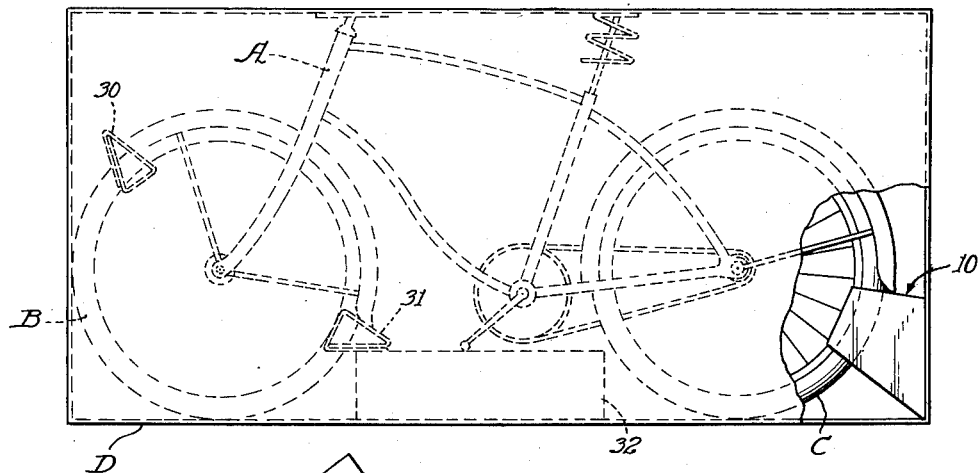
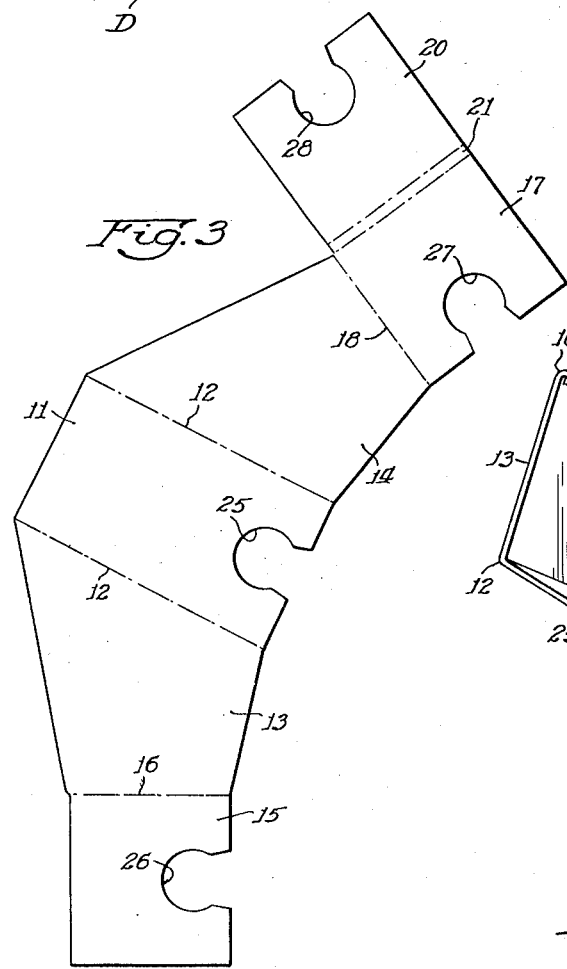
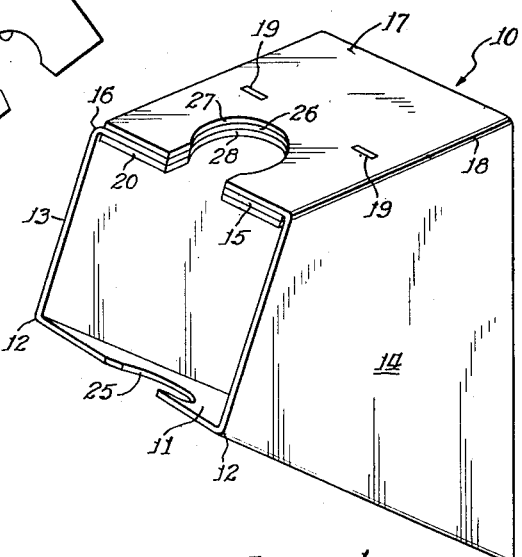
Inventors:
Charles R. Rothe and
Julian D'Esposito
By: E. A. Wagonseller
Atty.

Patented Sept. 2, 1952

2,609,091

UNITED STATES PATENT OFFICE 2,609,091

BICYCLE WHEEL BRACE

Charles R. Rothe, Glen Ellyn, and Julian D'Esposito, Chicago, Ill., assignors to Container Corporation of America, Chicago, Ill., a corporation of Delaware Application June 14, 1949, Serial No. 99,089

4 Claims. (Cl. 206—46)

This invention relates to a packing brace and blank therefor formed of sheet material for holding a wheel or other article within an outer container to prevent shifting of the article during transportation. More particularly the present invention relates to a packing brace and blank therefor that can be secured frictionally on the tire element of a wheel with other portions of the brace bearing against the interior walls of a shipping container to maintain the wheel against shifting movement in several directions.

The brace embodying the present invention is particularly adapted for use with tired wheels such as bicycle wheels, but is not limited to such use, as it is also adaptable for packing and bracing various other articles. In general the brace comprises a plurality of tire engaging panels held, by suitable connecting means, in spaced relation to each other so as to engage the periphery of a wheel at spaced points, the opposite edges of the panels being adapted to contact the interior surfaces of one or more walls of an enclosing container adapted for shipment of the article to be braced.

It is an object of the invention to provide a simple and easily assembled brace of sheet material for holding a packed article such as a bicycle wheel from shifting movement during shipment. Another object is to provide a brace that can be secured frictionally on a wheel, preferably the rear wheel, of a bicycle preparatory to insertion of the partly assembled bicycle into a relatively narrow, deep and elongated container which will rather snugly contain a bicycle with the wheels assembled with the frame but with handle bars, seat and pedal elements detached. A further object is to form the brace of a single blank of foldable sheet material such as paperboard which has been suitably cut and creased to enable it to be shipped flat to the user and by such user quickly and easily set up by the use of convenient materials such as staples or adhesive.

Additional objects and advantages of the present invention will become apparent from the following description and from the drawings, in which:

Fig. 1 is an elevational view of a partially assembled bicycle in a shipping container with one wall of the container being illustrated as being partially broken away, the wheel brace of the present invention being engaged with the rear wheel;

Fig. 2 is a perspective view of the wheel brace as it appears when set up and ready for assembly with a bicycle wheel; and Fig. 3 is a plan view of a preferred form of blank from which the wheel brace is formed.

Referring to Fig. 1 of the drawings, a partially assembled bicycle A, including the front and rear wheels B and C, is shown in a shipping container D, one of the principal walls of which has been broken away to show the packing arrangement. The wheel brace of this invention, designated as a whole at 10, is illustrated as applied to the rear wheel C.

The blank for the wheel brace, illustrated in Fig. 2, may be manufactured from any suitable sheet material such as corrugated paperboard. A panel 11, which may for convenience be termed the lower tire engaging panel, is formed centrally of the blank. On each side of panel 11 and defined therefrom by crease lines 12, 12, are formed sections or panels 13 and 14 which, for convenience, are sometimes herein referred to as vertically extending sections. At the end of section 13 there is provided a panel portion 15 defined from the section 13 by crease line 16. On the remote end of section 14 there is provided a panel portion 17 defined from section 14 by crease line 18.

As illustrated in Fig. 3 the panel portions 15 and 17 will be brought to lie flat against each other and in this position they are preferably secured together, as by means of staples 19. The two panel portions 15 and 17 together constitute what may be termed the upper wheel engaging panel. The sections 13 and 14 comprise connecting means between the upper and lower panels adapted to retain them in fixed relation to each other.

For the purpose of increasing the bearing surface and to facilitate accurate assembly of the brace an additional or supplemental panel portion 20 is formed as an extension on the edge of panel portion 17. This panel portion is positioned so as to be bent down around the rear edge of panel portion 15 and to underlie this panel portion. In order to accommodate the thickness of the panel portion 15 a double width crease line 21 is formed in the paperboard between portions 17 and 20. It is to be noted that panel 20 serves to strengthen or reinforce the panels 15 and 17.

The panel 11 and panel portions 15, 17 and 20 are each preferably formed with a tire-receiving opening indicated at 25, 26, 27 and 28, respectively. While the shape of these openings may be varied they are preferably made of generally U-shape with the entrance to the opening somewhat restricted. The main part of the opening is preferably made with a diameter slightly less than the tire diameter. The panels can thus be engaged frictionally with the tire of a bicycle wheel. The frictional gripping of the brace with the tire is not an indispensable part of the invention but is preferred as this feature enables the packer to secure the brace upon a bicycle wheel and then deposit the assembled bicycle and brace within the shipping container to assume the position indicated in Fig. 1.

For a given size bicycle wheel the parts of the brace will be made of sufficient size so that the upper panel will preferably engage the tire upon a plane passing through the axis of the wheel and as nearly approaching the horizontal as permitted by the rear mudguard, and the size of the outer shipping container is such that when the bicycle is in its final position the rear edge of the upper panel will be in contact with the narrow end wall of the shipping container.

The line of juncture of the sections 13 and 14 with the panel 11 is preferably at an acute angle with respect to the upper panel whereby the lower panel 11 will extend radially outwardly of the wheel and the lower edge of panel 11 will preferably come to rest on the inner surface of the shipping container along the line of connection between the narrow end wall and the bottom wall of the container.

The width of upper and lower tire engaging panels is preferably the same as the interior width of the shipping container to prevent or minimize sidewise movement of the wheel.

The front wheel may be braced in with any desired form of bracing elements indicated at 30 and 31 which will tend to prevent sidewise movement of the front wheel.

The shipping unit will also preferably include a box 32 for handle bars, seat and pedals.

In the use of the wheel brace of the present invention the brace, after being assembled from the flat blank as described above, is placed frictionally on the rear tire of a bicycle with the tapered portion of the brace directed downward. The front wheel braces will be placed on the front wheel and the bicycle with braces secured on the wheels can be inserted into a shipping container through the open top. The tapered shape of the rear wheel brace tends to simplify the operation of starting the brace into the shipping container. This can be done by moving the bicycle at a slight angle to the container and allowing the tapered edge of the brace to just enter the container whereupon the bicycle is swung back into alignment with the container and the front and rear braces will slide downwardly with their edges closely contacting the inner surfaces of the large panels of the shipping container.

After the bicycle has been placed within the container, as above described, it is only necessary to close the top of the container and the bicycle is ready for shipment.

While the foregoing description sets forth a preferred embodiment of the invention, certain changes may be made in the construction without departing from the spirit of the invention, and it is therefore, desired that the present embodiment be considered in all respects as illustrative and not restrictive, reference being had to the appended claims rather than to the foregoing description to indicate the scope of the invention.

We claim:

1. A paperboard packing brace adapted for disposition in a shipping container to hold a wheel spaced axially from parallel walls thereof and radially from another wall connecting the parallel walls, which comprises a tubular structure defined by two spaced end panels having front, rear, and side edges and disposed at an acute angle to each other with the front edges closer than the rear edges, the end panels being substantially equal in width but unequal in length, and a pair of side panels extending between the side edges of the end panels, the end panels having recesses formed in their front edges spaced from both side edges and shaped to the cross section of the circumferential portion of a wheel to be braced, the rear edges of the panels lying in a common plane, whereby the brace may be disposed in an enclosing container with its forward portion frictionally engaged on the wheel with its rear portion engaging the connecting wall and with the rear edge of the longer of said end panels engaging in a corner of said carton and the side panels engaging the parallel walls to maintain the wheel spaced from such walls.

2. A packing brace of paperboard adapted to be disposed in a shipping container having parallel side walls and bottom and end walls connecting the side walls for holding a wheel spaced axially from the side walls and radially from an end wall, which comprises a tubular structure of rectangular section defined by two spaced end panels substantially equal in width but unequal in length and having front, rear, and side edges and disposed at an angle to each other corresponding to the angle between two wheel radii with the front edges closer than the rear edges, a pair of side panels integral with one of the end panels extending between corresponding side edges of the end panels, one of the side panels being also integral with the other of the end panels, and means securing the other side panel to said other end panel, the end panels having recesses formed in their front edges spaced from both side edges and shaped to the cross section of the circumferential portion of a wheel to be braced, the rear edges of the panels lying in a common plane, whereby the brace may be disposed in an enclosing container with its forward portion frictionally engaged on the wheel with its rear portion engaging the connecting wall and with the rear edge of the longer end panel engaging the intersection of the bottom and one of said end walls and the side panels engaging the parallel walls to maintain the wheel spaced from such walls.

3. A paperboard packing brace for disposition in a shipping container to hold a wheel spaced axially from parallel walls thereof and radially from a wall connecting the parallel walls, which comprises two spaced substantially rectangular panels of unequal length but of a width substantially equal to the distance between the parallel container walls disposed at an acute angle to each other with corresponding side edges in parallel planes, the edges of the panels nearest each other having similar recesses therein spaced from the side edges and shaped to the cross section of the circumferential portion of a wheel to be braced, and a pair of side panels connecting the corresponding side edges of the rectangular panels, whereby the brace may be frictionally engaged on a wheel by means of said recesses and disposed in an enclosing container with the side panels in surface contact with the parallel walls and edge portions of the rectangular panels engaging the connecting wall, the edge portion of the longer rectangular panel engaging an inner corner of said carton.

4. A blank for a wheel packing brace, comprising a sheet of paperboard cut and creased to define a plurality of serially connected panels including a first substantially rectangular panel, a pair of equal and opposite trapezial panels hinged to opposite edges of the first panel, a second substantially rectangular panel hinged to an edge of one of the trapezial panels opposite the first panel, the rectangular panels having similar recesses in corresponding edges spaced from the side edges and shaped to the cross section of the circumferential portion of a wheel for which the brace is adapted, a third rectangular panel substantially identical to said second panel and hinged to an edge of the other trapezial panel opposite the first panel, and a fourth rectangular panel substantially identical to said second panel and hingedly connected to the edge of the second panel parallel to the crossed edge thereof, the recessed edge of the fourth panel extending parallel to its hinged edge.

CHARLES R. ROTHE.
JULIAN D'ESPOSITO.

REFERENCES CITED

The following references are of record in the file of this patent:

UNITED STATES PATENTS

| Number | Name | Date |
| --- | --- | --- |
| 1,233,454 | Dietsche | July 17, 1917 |
| 1,250,937 | Achert | Dec. 25, 1917 |
| 2,011,383 | Taylor | Aug. 13, 1935 |
| 2,261,280 | Pennebaker et al. | Nov. 4, 1941 |
| 2,479,453 | Amatel | Aug. 16, 1949 |
| 2,490,186 | Yarman | Dec. 6, 1949 |